US012693752B2

(12) United States Patent
Park

(10) Patent No.: US 12,693,752 B2
(45) Date of Patent: *Jul. 28, 2026

(54) NON-RIGID DEVICE AND DISPLAY DEVICE

(71) Applicant: SAMSUNG DISPLAY CO., LTD., Yongin-si (KR)

(72) Inventor: Myoungseo Park, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/192,281

(22) Filed: Apr. 28, 2025

(65) Prior Publication Data

US 2025/0258558 A1 Aug. 14, 2025

Related U.S. Application Data

(63) Continuation of application No. 16/841,691, filed on Apr. 7, 2020, now Pat. No. 12,287,930.

(30) Foreign Application Priority Data

Apr. 24, 2019 (KR) ........................ 10-2019-0047837
Jun. 19, 2019 (KR) ........................ 10-2019-0072825

(51) Int. Cl.
*G06F 3/047* (2006.01)
*G06F 3/041* (2006.01)

(52) U.S. Cl.
CPC ........... *G06F 3/0412* (2013.01); *G06F 3/047* (2013.01); *G06F 2203/04102* (2013.01)

(58) Field of Classification Search
CPC .................. G06F 3/0412; G06F 3/047; G06F 2203/04102; G06F 3/0443; G06F 3/0446; G06F 3/0448; G06F 2203/04111
See application file for complete search history.

(56) References Cited

U.S. PATENT DOCUMENTS

| | | | |
|---|---|---|---|
| 9,891,670 | B2 | 2/2018 | Kim et al. |
| 10,347,700 | B2 | 7/2019 | Yang et al. |

(Continued)

FOREIGN PATENT DOCUMENTS

| | | | | |
|---|---|---|---|---|
| CN | 105786237 | 7/2016 | | |
| CN | 112162650 A | * | 1/2021 | ........... G06F 3/0412 |

(Continued)

*Primary Examiner* — Temesghen Ghebretinsae
*Assistant Examiner* — Karin Kiyabu
(74) *Attorney, Agent, or Firm* — Womble Bond Dickinson (US) LLP

(57) ABSTRACT

A device with a flexible region that is manipulable in a second standard direction substantially perpendicular to a rotational axis extending in a first standard direction includes a flexible touch sensing panel. The flexible touch sensing panel includes first touch sensing electrodes and a first bridge. The first bridge is on a layer substantially different from a layer on which the first touch sensing electrodes are located and the first bridge connects two first touch sensing electrodes adjacent to each other. The first bridge includes a first portion extending in a first extension direction, which forms a first angle with the first standard direction. The first angle is not about k×90° (where "k" is a non-zero positive or negative odd integer) and is not about m×180° (where "m" is an integer).

16 Claims, 14 Drawing Sheets

(56)                References Cited

U.S. PATENT DOCUMENTS

| | | | | |
|---|---|---|---|---|
| 10,585,526 | B2 | 3/2020 | Kim et al. | |
| 10,877,587 | B2 * | 12/2020 | Lee | G06F 3/0445 |
| 10,891,008 | B2 | 1/2021 | Lee et al. | |
| 10,983,617 | B2 * | 4/2021 | Moon | G06F 3/0448 |
| 11,061,504 | B2 * | 7/2021 | Cho | G06F 3/04164 |
| 11,188,179 | B2 * | 11/2021 | Zheng | G06F 3/0443 |
| 11,199,937 | B2 * | 12/2021 | Choi | H10K 59/40 |
| 11,275,473 | B2 * | 3/2022 | Bok | G06F 3/0443 |
| 11,579,735 | B2 * | 2/2023 | Ye | G06F 3/0446 |
| 11,687,191 | B2 * | 6/2023 | Park | H10K 59/40 |
| | | | | 345/173 |
| 11,747,949 | B2 * | 9/2023 | Byun | G06F 3/0445 |
| | | | | 345/174 |
| 11,782,562 | B2 * | 10/2023 | Wang | G06F 3/0445 |
| | | | | 345/173 |
| 11,803,280 | B2 * | 10/2023 | Hu | G06F 3/0443 |
| 12,118,161 | B2 * | 10/2024 | Kim | G06F 3/041 |
| 12,147,639 | B2 * | 11/2024 | Zhang | G06F 3/041 |

| | | | | |
|---|---|---|---|---|
| 2011/0221698 | A1 | 9/2011 | Ku et al. | |
| 2016/0239133 | A1 | 8/2016 | Ko et al. | |
| 2018/0032188 | A1 | 2/2018 | Park et al. | |
| 2018/0348918 | A1 | 12/2018 | Rhe et al. | |
| 2018/0348930 | A1 | 12/2018 | Lee et al. | |
| 2019/0112520 | A1 | 4/2019 | Knoer et al. | |
| 2021/0365151 | A1 | 11/2021 | Zhang et al. | |
| 2022/0187979 | A1 * | 6/2022 | Jung | G06F 3/0446 |

FOREIGN PATENT DOCUMENTS

| | | | | |
|---|---|---|---|---|
| KR | 10-2016-0101315 | | 8/2016 | |
| KR | 10-2016-0104177 | | 9/2016 | |
| KR | 10-2017-0113822 | | 10/2017 | |
| KR | 20180049360 | A | 5/2018 | |
| KR | 10-2018-0127477 | | 11/2018 | |
| KR | 10-2018-0131768 | | 12/2018 | |
| KR | 10-2018-0131827 | | 12/2018 | |
| KR | 20260008607 | A * | 1/2026 | H10K 59/873 |

* cited by examiner

NON-RIGID DEVICE AND DISPLAY DEVICE

CROSS-REFERENCE TO RELATED APPLICATIONS

This application is a continuation of U.S. patent application Ser. No. 16/841,691, filed Apr. 7, 2020, which claims priority to and the benefit of Korean Patent Application No. 10-2019-0047837, filed Apr. 24, 2019, and Korean Patent Application No. 10-2019-0072825, filed Jun. 19, 2019, the entire content of all of which is incorporated herein by reference.

BACKGROUND

Field

Exemplary embodiments generally relate to devices, and, more particularly, to devices including an input sensing sensor.

Discussion

Various display devices may be applied to a multimedia device, such as a television set, a mobile phone, a tablet computer, a navigation unit, a game unit, etc. As an input unit of a display device, a keyboard or a mouse may be used. In addition, the display device may include a touch panel as an input unit.

The above information disclosed in this section is only for understanding the background of the inventive concepts, and, therefore, may contain information that does not form prior art.

SUMMARY

Some exemplary embodiments are capable of providing a device with reduced defects.

Some exemplary embodiments are capable of providing a non-rigid device with reduced defects.

Some exemplary embodiments are capable of providing a display device including an input sensing sensor with reduced defects.

Additional aspects will be set forth in the detailed description which follows, and, in part, will be apparent from the disclosure, or may be learned by practice of the inventive concepts.

According to an exemplary embodiment, a non-rigid device with a flexible region that is foldable, slidable, or rollable in a second standard direction substantially perpendicular to a rotational axis extending in a first standard direction includes a flexible touch sensing panel. The flexible touch sensing panel includes first touch sensing electrodes and a first bridge. The first bridge is on a layer substantially different from a layer on which the first touch sensing electrodes are located. The first bridge connects two first touch sensing electrodes adjacent to each other. The first bridge includes a first portion extending in a first extension direction forming a first angle with the first standard direction. The first angle is not about $k \times 90°$ (where "k" is a non-zero positive or negative odd integer) and is not about $m \times 180°$ (where "m" is an integer).

According to an exemplary embodiment, a non-rigid device with a flexible region that is foldable, slidable, or rollable in a second standard direction substantially perpendicular to a rotational axis extending in a first standard direction includes a flexible display panel and a flexible touch sensing panel on the flexible display panel. The flexible display panel includes an active area including emitting portions spaced apart from each other and a non-emitting area disposed between the emitting portions and a peripheral area surrounding the active area. The flexible touch sensing panel includes a touch sensing electrode and a signal transmission line transmitting a signal sensed by the touch sensing electrode to the peripheral area. The signal transmission line includes a first portion extending in a first extension direction, which forms a first angle with the first standard direction. The first angle is not about $q \times 90°$ (where "q" is a non-zero positive or negative odd integer) and is not about $r \times 180°$ (where "r" is an integer). The touch sensing electrode and the signal transmission line are integrally formed with each other on a same layer as one piece or are disposed on substantially different layers from each other.

According to an exemplary embodiment, a display device includes a display panel and a touch sensing panel on the display panel. The display panel includes an active area including emitting portions spaced apart from each other and a non-emitting area between the emitting portions and a peripheral area surrounding the active area. The touch sensing panel includes a touch sensing electrode overlapping the active area and a signal transmission line transmitting a signal sensed by the touch sensing electrode to the peripheral area. The touch sensing electrode and the signal transmission line are integrally formed with each other on a same layer as one piece or are disposed on substantially different layers from each other.

According to various exemplary embodiments, even though a bridge or a signal transmission line may be disposed on a same or a substantially different layer than a touch sensing electrode, a flexible touch sensing panel including the bridge or the signal transmission line may be folded many times from the viewpoint of a folding axis such that it is possible to reduce damage to the bridge and/or the signal transmission line, as well as relieve creases and/or buckling of the flexible touch sensing panel due to the bridge or signal transmission line.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts. In the drawings.

DETAILED DESCRIPTION OF SOME EXEMPLARY EMBODIMENTS

Figure 1:
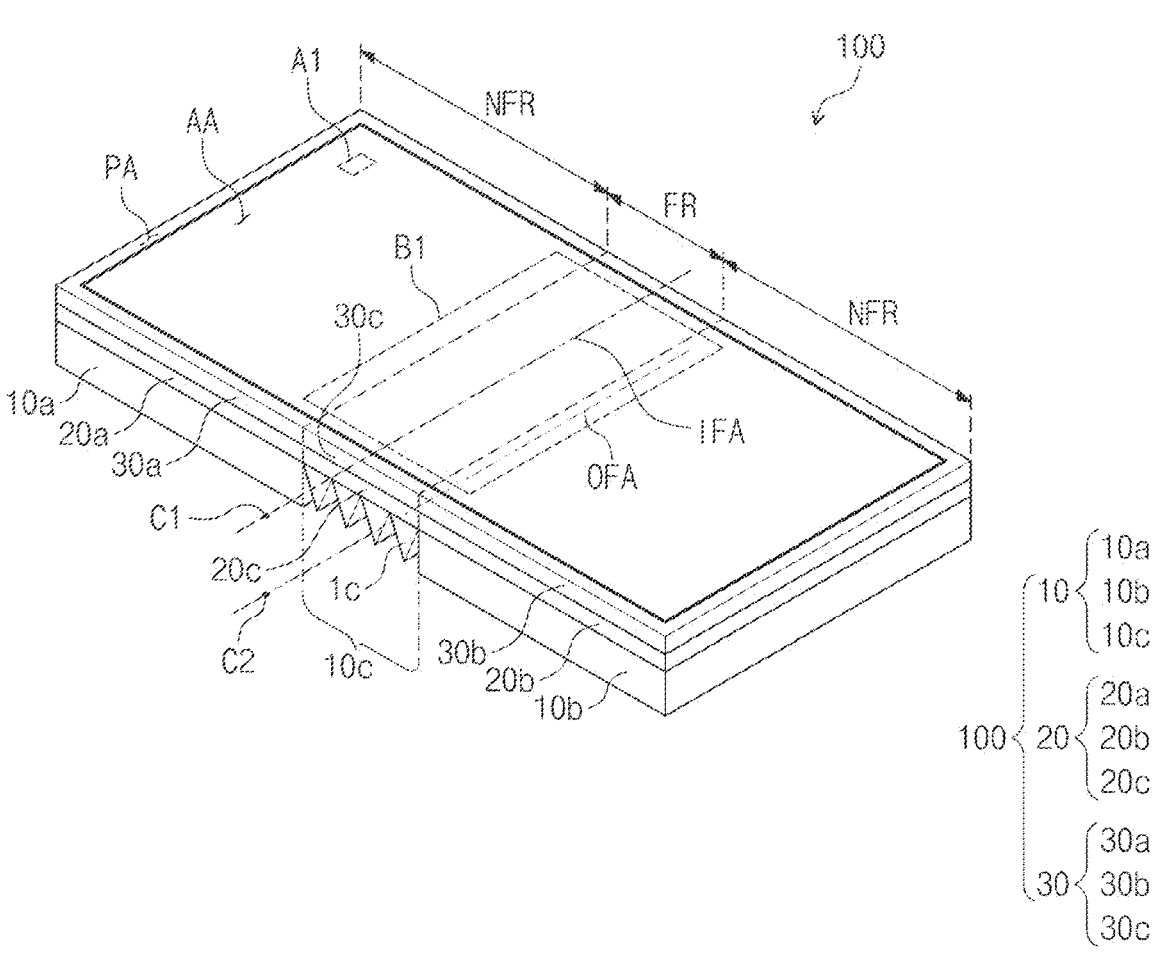
FIG. 1 is a perspective view showing a foldable display device according to an exemplary embodiment.

In the following description, for the purposes of explanation, numerous specific details are set forth in order to provide a thorough understanding of various exemplary embodiments. As used herein, the terms "embodiments" and "implementations" are used interchangeably and are non-limiting examples employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be substantially different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some exemplary embodiments. Therefore, unless otherwise specified, the features, components, modules, layers, films, panels, regions, aspects, etc. (hereinafter individually or collectively referred to as an "element" or "elements"), of the various illustrations may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. As such, the sizes and relative sizes of the respective elements are not necessarily limited to the sizes and relative sizes shown in the drawings. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. Other terms and/or phrases used to describe a relationship between elements should be interpreted in a like fashion, e.g., "between" versus "directly between," "adjacent" versus "directly adjacent," "on" versus "directly on," etc. Further, the term "connected" may refer to physical, electrical, and/or fluid connection. In addition, the X-axis, the Y-axis, and the Z-axis are not limited to three axes of a rectangular coordinate system, and may be interpreted in a broader sense. For example, the X-axis, the Y-axis, and the Z-axis may be perpendicular to one another, or may represent different directions that are not perpendicular to one another. For the purposes of this disclosure, "at least one of X, Y, and Z" and "at least one selected from the group of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional views, isometric views, perspective views, plan views, and/or exploded illustrations that are schematic illustrations of idealized exemplary embodiments and/or intermediate structures. As such, variations from the shapes of the illustrations as a result of, for example, manufacturing techniques and/or tolerances, are to be expected. Thus, exemplary embodiments disclosed herein should not be construed as limited to the particular illustrated shapes of regions, but are to include deviations in shapes that result from, for instance, manufacturing. To this end, regions illustrated in the drawings may be schematic in nature and shapes of these regions may not reflect the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, various exemplary embodiments will be explained in detail with reference to the accompanying drawings.

FIG. 1 is a perspective view showing a foldable display device according to an exemplary embodiment.

Referring to FIG. 1, a foldable display device 100 includes a support structure 10, a flexible display panel 20, and a flexible touch sensing panel 30.

The support structure 10 includes a first section 10a, a second section 10b, and a third section 10c. The first section 10a and the second section 10b are rigid. The first section 10a and the second section 10b are spaced apart from each other. The third section 10c is flexible. For the purposes of this disclosure, the concept of "flexibility" also includes a case that a plurality of rigid portions is connected to each other to have overall flexibility. For example, the third section 10c may be, but is not limited to, a multi joint structure that includes joints 1c. The third section 10c may not be used depending on occasions (or implementations), and, as such, the third section 10c between the first section 10a and the second section 10b may be an empty space, such as a patterned portion of support structure 10.

The flexible display panel 20 is disposed on the support structure 10. The flexible display panel 20 includes a first section 20a, a second section 20b, and a third section 20c. The first section 20a, the second section 20b, and the third section 20c of the flexible display panel 20 are disposed on the first section 10a, the second section 10b, and the third section 10c of the support structure 10, respectively.

The flexible display panel 20 may be a flexible organic light emitting display panel, but exemplary embodiments are not limited thereto. The flexible display panel 20 includes an active area AA through which an image is displayed and a peripheral area PA outside (e.g., surrounding) the active area AA.

The flexible touch sensing panel 30 is disposed on the flexible display panel 20. The flexible touch sensing panel 30 includes a first section 30a, a second section 30b, and a third section 30c. The first section 30a, the second section 30b, and the third section 30c of the flexible touch sensing panel 30 are disposed on the first section 20a, the second section 20b, and the third section 20c of the flexible display panel 20, respectively. In this manner, the flexible display panel 20 may be disposed between the flexible touch sensing panel 30 and the support structure 10.

The third section 10c of the support structure 10, the third section 20c of the flexible display panel 20, and the third section 30c of the flexible touch sensing panel 30 correspond to a folding region FR of the foldable display device 100. The folding region FR is a flexible region having flexibility, e.g., configured to be intentionally bended, folded, rolled, twisted, and/or the like.

The first section 10a and the second section 10b of the support structure 10, the first section 20a and the second section 20b of the flexible display panel 20, and the first section 30a and the second section 30b of the flexible touch sensing panel 30 correspond to a non-folding region NFR of the foldable display device 100. The non-folding region NFR is a non-flexible region that does not have the flexibility, e.g., not configured to be intentionally bended, folded, rolled, twisted, and/or the like.

Figure 2:
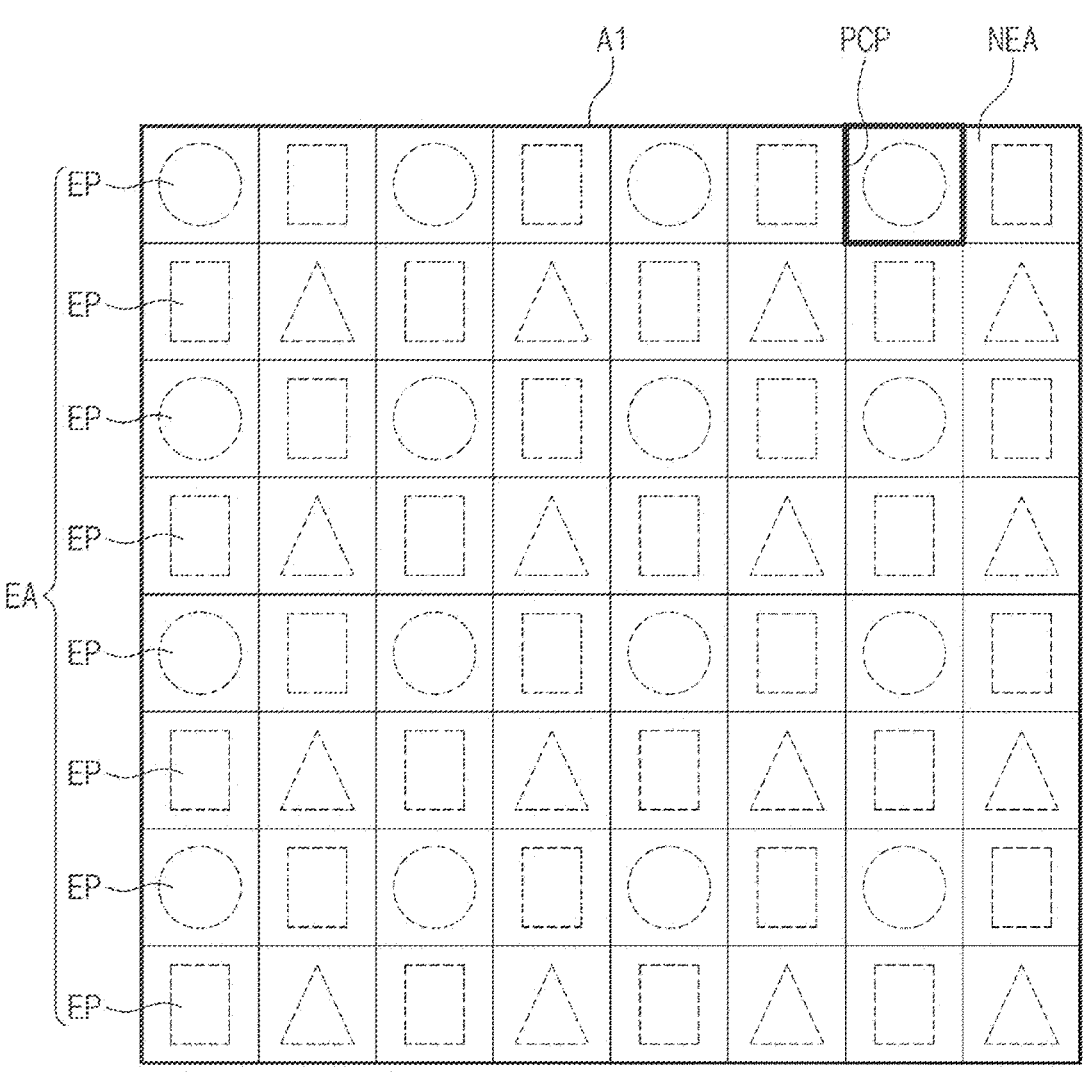
FIG. 2 is a plan view showing a flexible display panel in an area A1 of the foldable display device shown in FIG. 1 according to an exemplary embodiment.

FIG. 2 is a plan view showing the flexible display panel in an area A1 of the foldable display device shown in FIG. 1 according to an exemplary embodiment.

Referring to FIG. 2, the flexible display panel 20 includes a plurality of pixel circuit portions PCP. The pixel circuit portion PCP is an area occupied by a driving circuit. The flexible display panel 20 includes a plurality of emitting portions EP. The emitting portion EP emits a light. The lights from the emitting portions EP make an image displayed on the foldable display device 100. The pixel circuit portions PCP may correspond to the emitting portions EP, respectively. In FIG. 2, the emitting portions EP completely overlap the pixel circuit portions PCP, however, according to some exemplary embodiments, the pixel circuit portions PCP and the emitting portions EP may partially overlap each other or may not overlap each other.

In the case where the flexible display panel 20 is an organic light emitting display panel, the emitting portions EP are respective areas in which an anode, an intermediate layer disposed on the anode and including a light emitting layer, and a cathode disposed on the intermediate layer completely overlap each other without an insulating layer interposed therebetween. The emitting portions EP form an emitting area EA. An area except for the emitting area EA corresponds to a non-emitting area NEA of the active area AA.

Figure 3:
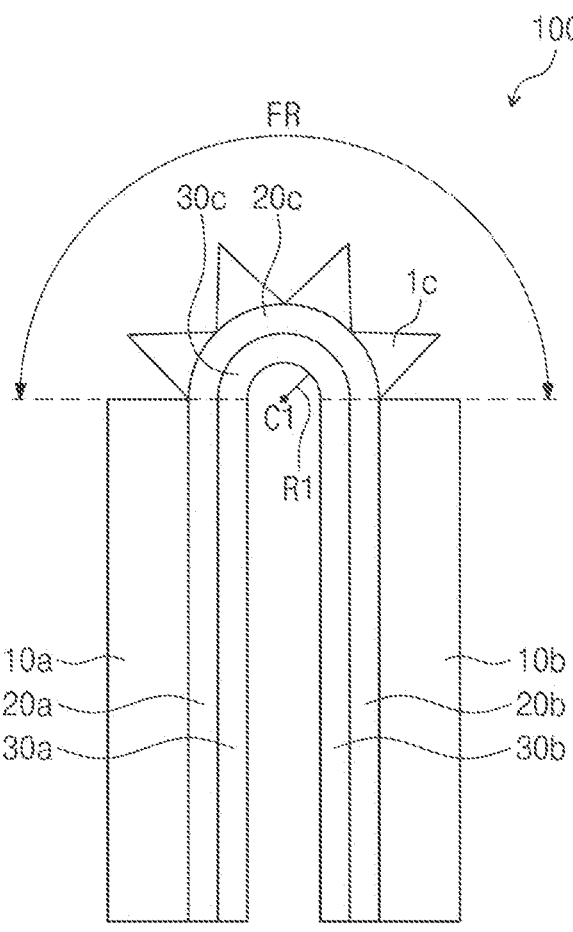
FIG. 3 is a cross-sectional view showing an in-folding operation of the foldable display device shown in FIG. 1 according to an exemplary embodiment.

FIG. 3 is a cross-sectional view showing an in-folding operation of the foldable display device shown in FIG. 1 according to an exemplary embodiment.

Referring to FIGS. 1 and 3, the folding region FR of the foldable display device 100 may be inwardly folded at an in-folding radius R1 with respect to an in-folding axis IFA crossing an in-folding center C1. In this case, the first section 30a and the second section 30b of the flexible touch sensing panel 30 face each other, and the first section 10a and the second section 10b of the support structure 10 are disposed opposite to each other. In some exemplary embodiments, the third section 10c, which includes the joints 1c, of the support structure 10 may be omitted. The in-folding axis IFA corresponds to a rotational axis.

Figure 4:
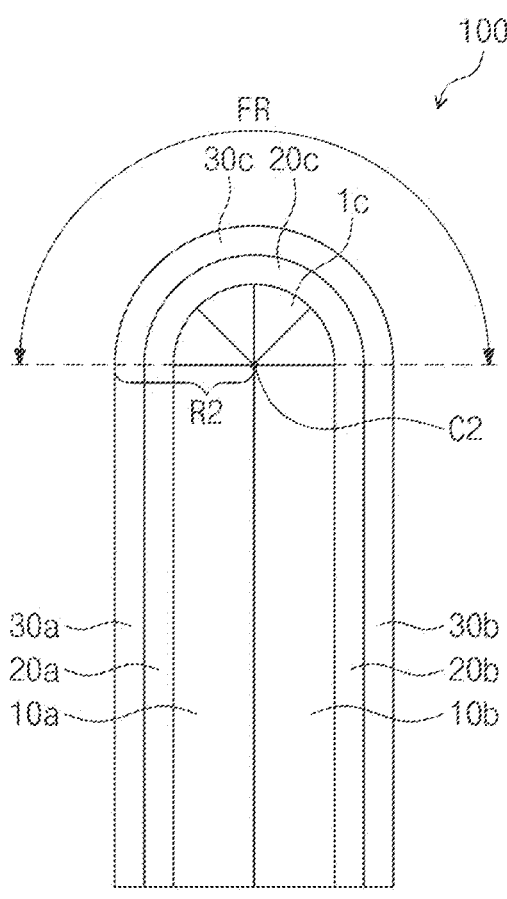
FIG. 4 is a cross-sectional view showing an out-folding operation of the foldable display device shown in FIG. 1 according to an exemplary embodiment.

FIG. 4 is a cross-sectional view showing an out-folding operation of the foldable display device 100 shown in FIG. 1.

Referring to FIGS. 1 and 4, the folding region FR of the foldable display device 100 may be outwardly folded at an out-folding radius R2 with respect to an out-folding axis OFA crossing an out-folding center C2. In this case, the first section 10a and the second section 10b of the support structure 10 face each other, and the first section 30a and the second section 30b of the flexible touch sensing panel 30 are disposed opposite to each other. In this case, the out-folding axis OFA corresponds to a rotational axis.

Figure 5:
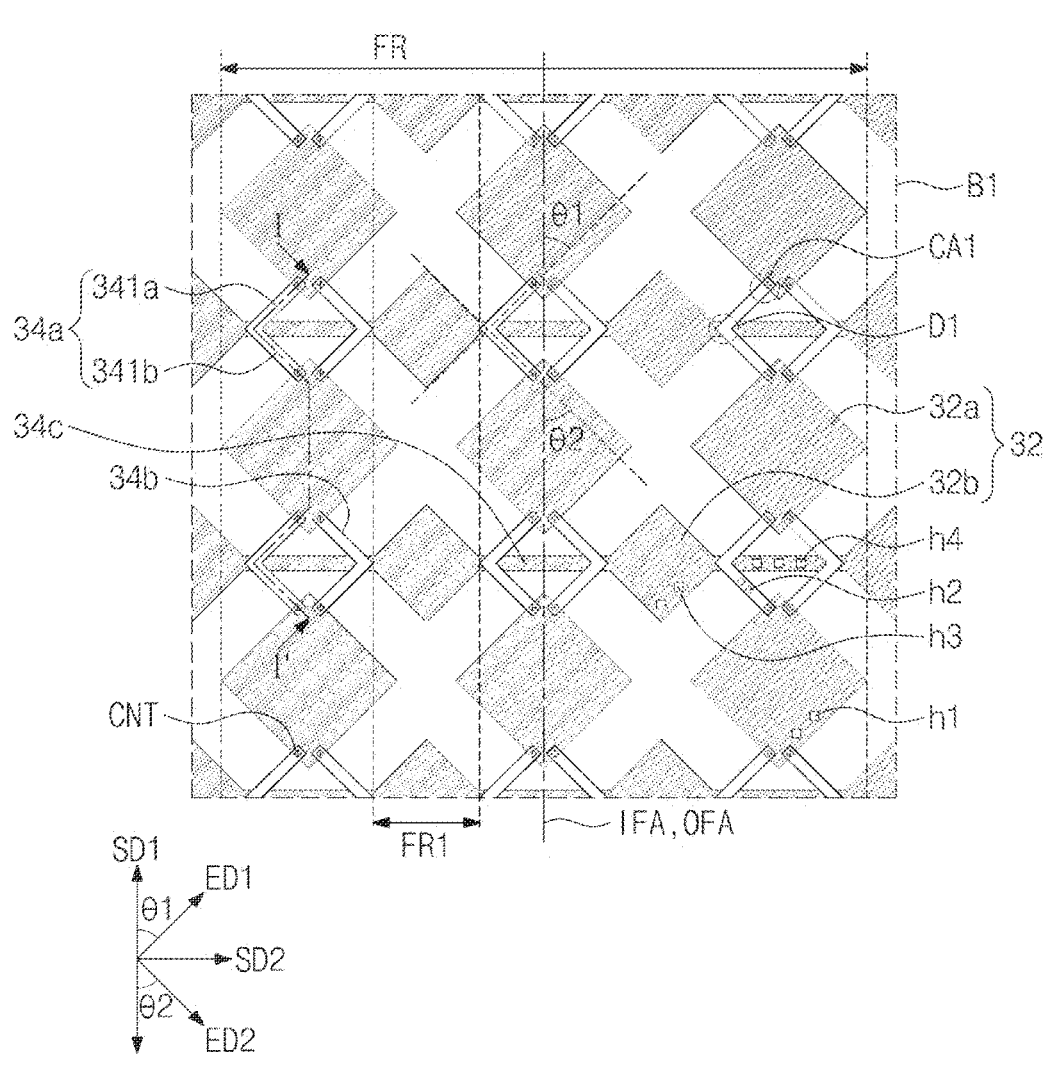
FIG. 5 is a plan view showing a flexible touch sensing panel in an area B1 of FIG. 1 according to an exemplary embodiment.

FIG. 5 is a plan view showing the flexible touch sensing panel in an area B1 of FIG. 1 according to an exemplary embodiment.

Referring to FIG. 5, touch sensing electrodes 32 include first touch sensing electrodes 32a and second touch sensing electrodes 32b.

The first touch sensing electrodes 32a are arranged in a first standard direction SD1 to be electrically connected to each other. The first standard direction SD1 is (or is substantially) parallel to the in-folding axis IFA or the out-folding axis OFA. The first touch sensing electrodes 32a include at least one light transmission hole h1. The light transmission hole h1 corresponds to the emitting portion EP of the flexible display panel 20 such that the first touch sensing electrodes 32a do not interfere with a light emission from the emitting portion EP.

A first bridge 34a connects two first touch sensing electrodes 32a adjacent to each other.

The first bridge 34a may include at least one light transmission hole h2. The light transmission hole h2 corresponds to the emitting portion EP of the flexible display panel 20 such that the first bridge 34a does not interfere with the light emission from the emitting portion EP. However, the first bridge 34a may not include a light transmission hole. In this case, the first bridge 34a is disposed not to overlap the emitting area EA and to overlap only the non-emitting area NEA such that the first bridge 34a does not interfere with the light emission from the emitting area EA. The first bridge 34a has a relatively small width and a relatively small area. Thus, it is possible to minimize (or at least reduce) interference with the light emission from the emitting portion EP by the first bridge 34a even if the emitting portion EP overlaps with the first bridge 34a due to an error in arrangement.

The first bridge 34a includes a first portion 341a and a second portion 341b.

The first portion 341a extends in a first extension direction ED1 that forms a first angle $\theta 1$ with the first standard direction SD1. In a case where the first angle $\theta 1$ is about "k×90°" (where k is a non-zero positive or negative odd integer), the first portion 341a is easily damaged when the folding region FR is folded, and in a case where the first angle $\theta 1$ is about "m×180°" (where m is an integer), a crease or a buckling may easily occur in the folding region FR when the folding region FR is folded several times. Accordingly, it is advantageous that the first angle $\theta 1$ is not about "k×90°" and not about "m×180°."

The second portion 341b extends in a second extension direction ED2 that forms a second angle $\theta 2$ with the first standard direction SD1. The second extension direction ED2 is not substantially in line with the first extension direction ED1 and is not substantially parallel to the first extension direction ED1. An angle between the first extension direction ED1 and the second extension direction ED2 may be about "u×90°" (where u is a non-zero positive or negative odd integer).

In a case where the second angle $\theta 2$ is about "n×90°" (where n is a non-zero positive or negative odd integer), the second portion 341b is easily damaged when the folding region FR is folded, and in a case where the second angle $\theta 2$ is about "p×180°" (where p is an integer), a crease or a buckling may easily occur in the folding region FR when the folding region FR is folded several times. Accordingly, it is advantageous that the second angle $\theta 2$ is not about "n×90°" and not about "p×180°."

A second bridge 34b may be further included in the flexible touch sensing panel 30. The second bridge 34b is substantially symmetrical with the first bridge 34a with respect to a direction in which the first touch sensing electrodes 32a are electrically connected to each other. The second bridge 34b may have substantially the same structure as that of the first bridge 34a. The second bridge 34b may be formed through the same process as the first bridge 34a when the first bridge 34a is formed. As the flexible sensing panel 30 further employs the second bridge 34b, the first touch sensing electrodes 32a are more securely electrically connected to each other.

The second touch sensing electrodes 32b are arranged in a second standard direction SD2 to be electrically connected to each other. Each of the second touch sensing electrodes 32b has a smaller area than each of the first touch sensing electrodes 32a. The second touch sensing electrodes 32b include at least one light transmission hole h3, and the light transmission hole h3 corresponds to the emitting portion EP of the emitting area EA of the flexible display panel 20 such that the second touch sensing electrodes 32b do not interfere with the light emission from the emitting portion EP.

A third bridge 34c connects two second touch sensing electrodes 32b adjacent to each other. The third bridge 34c may be formed in the same layer as the second touch sensing electrodes 32b and integrally formed with the second touch sensing electrodes 32b as one piece. Although not shown, in some exemplary embodiments, the number of the third bridges 34c connected between two second touch sensing electrodes 32b adjacent to each other may be at least two.

The third bridge 34c may include at least one light transmission hole h4. The light transmission hole h4 corresponds to the emitting portion EP of the flexible display panel 20 such that the third bridge 34c does not interfere with the light emission from the emitting portion EP. Differently, the third bridge 34c may not include a light transmission hole. In this case, the third bridge 34c may be disposed not to overlap the emitting area EA and to overlap the non-emitting area NEA such that the third bridge 34c does not interfere with the light emission from the emitting area EA. The third bridge 34c has a relatively small width and a relatively small area. Thus, it is possible to minimize (or at least reduce) the interference with the light emission from the emitting portion EP by the third bridge 34c even if the emitting area EA overlaps with the third bridge 34c due to an error in arrangement.

It is advantageous that at least one selected from the group of the first touch sensing electrodes 32a, the second touch sensing electrodes 32b, the first bridge 34a, the second bridge 34b, and the third bridge 34c includes a metal material with flexibility by taking into account a stress applied to the folding region FR when the folding region FR is folded. For example, at least one selected from the group of the first touch sensing electrodes 32a, the second touch sensing electrodes 32b, the first bridge 34a, the second bridge 34b, and the third bridge 34c may have a metal single-layered structure or a metal multi-layered structure.

Figure 6:
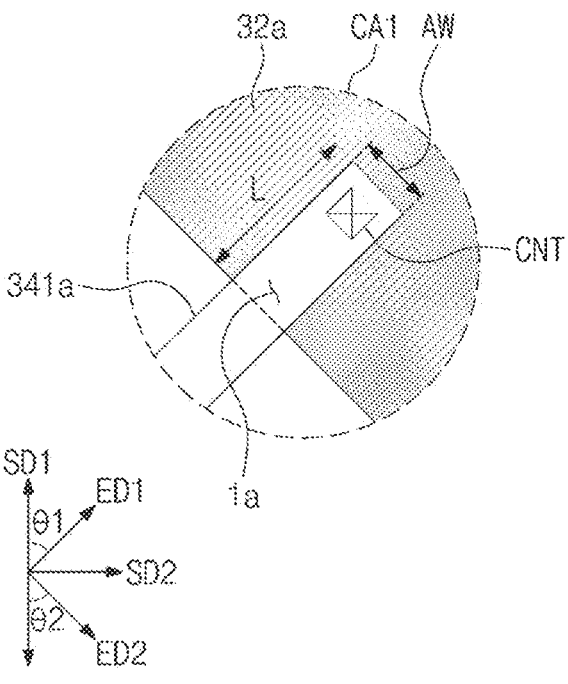
FIG. 6 is an enlarged view showing an area CA1 of FIG. 5 according to an exemplary embodiment.

FIG. 6 is an enlarged view showing an area CA1 of FIG. 5 according to an exemplary embodiment.

Referring to FIG. 6, the first portion 341a of the first bridge 34a includes at least one overlap area 1a. The overlap area 1a overlaps with a plane-occupied area occupied by the first touch sensing electrodes 32a, the second touch sensing electrodes 32b, and the third bridges 34c in a plan view. As seen in FIG. 6, the overlap area 1a is defined inside an outer line of the plane-occupied area. In this case, the overlap area 1a of the first portion 341a and a portion of at least one selected from the group of the first touch sensing electrodes 32a, the second touch sensing electrodes 32b, and the third bridge 34c, the portion vertically corresponding to the overlap area 1a of the first portion 341a, vertically form a double-layered structure.

The overlap area 1a of the first portion 341a may extend in the first extension direction ED1 that forms the first angle $\theta 1$ with the first standard direction SD1. For example, a length L of the overlap area 1a, which is measured in the first extension direction ED1, may be substantially greater than an average width AW of the overlap area 1a, which is measured in a direction substantially perpendicular to the first extension direction ED1, such as in the second extension direction ED2. As seen in FIG. 6, the average width AW has a value obtained by dividing an area of the overlap area 1a by the length L. It is advantageous that the first angle $\theta 1$ is set to have a value that is not about "k×90°" (where k is a non-zero positive or negative odd integer) and about "m×180°" (where m is an integer) to prevent the folding operation of the folding region FR from being interfered by the double-layered structure having a relatively small flexibility.

Figure 7:
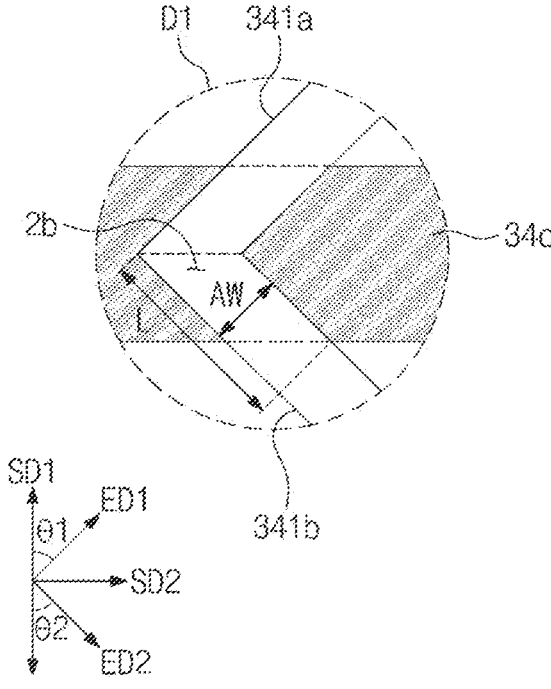
FIG. 7 is an enlarged view showing an area D1 of FIG. 5 according to an exemplary embodiment.

FIG. 7 is an enlarged view showing an area D1 of FIG. 5 according to an exemplary embodiment.

Referring to FIG. 7, the second portion 341b of the first bridge 34a includes at least one overlap area 2b. The overlap area 2b overlaps with a plane-occupied area occupied by the first touch sensing electrodes 32a, the second touch sensing electrodes 32b, and the third bridge 34c in a plan view. That is, the overlap area 2b is defined inside an outer line of the plane-occupied area. In this case, the overlap area 2b of the second portion 341b and a portion of at least one selected from the group of the first touch sensing electrodes 32a, the second touch sensing electrodes 32b, and the third bridge 34c, the portion vertically corresponding to the overlap area 2b of the second portion 341b, vertically form a double-layered structure.

The overlap area 2b of the second portion 341b may extend in the second extension direction ED2 that forms the second angle $\theta 2$ with the first standard direction SD1. For example, a length L of the overlap area 2b, which is measured in the second extension direction ED2, may be substantially greater than an average width AW of the overlap area 2b, which is measured in a direction substantially perpendicular to the second extension direction ED2. The average width AW has a value obtained by dividing the area of the overlap area 2b by the length L. It is advantageous that the second angle 82 is set to have a value that is not about "n×90°" (where n is a non-zero positive or negative odd integer) and about "p×180°" (where p is an integer) to prevent the folding operation of the folding region FR from being interfered by the double-layered structure having a relatively small flexibility.

Figure 8:
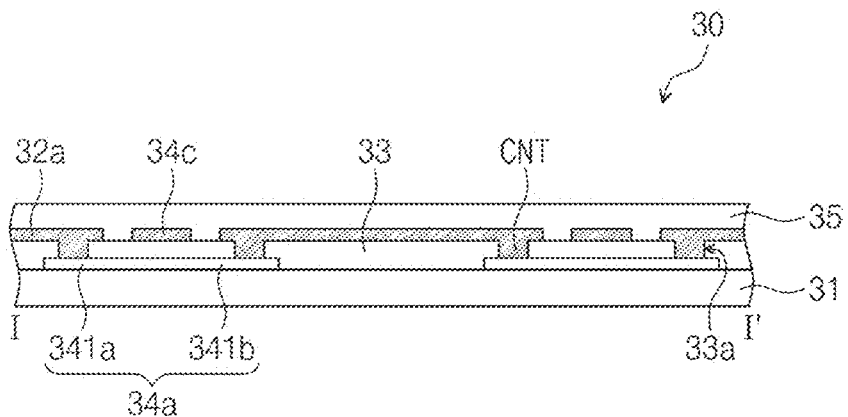
FIG. 8 is a cross-sectional view showing the flexible touch sensing panel taken along sectional line I-I' of FIG. 5 according to an exemplary embodiment.

FIG. 8 is a cross-sectional view showing the flexible touch sensing panel taken along sectional line I-I' shown in FIG. 5 according to an exemplary embodiment.

Referring to FIG. 8, the first bridge 34a is disposed on a first flexible insulating layer 31. The first flexible insulating layer 31 may include an inorganic material or an organic material. According to an exemplary embodiment, a multi-layered encapsulation structure included in the flexible display panel 20 may be employed as the first flexible insulating layer 31.

A second flexible insulating layer 33 is disposed on the first flexible insulating layer 31 to cover the first bridge 34a. The second flexible insulating layer 33 includes a contact hole 33a defined therethrough to expose the first bridge 34a. The second flexible insulating layer 33 may include an inorganic material or an organic material.

The first touch sensing electrodes 32a, the second touch sensing electrodes 32b, and the third bridge 34c are disposed on the second flexible insulating layer 33. The first touch sensing electrodes 32a may include a contact CNT formed integrally therewith as one piece and electrically connected to the first bridge 34a via the contact hole 33a. As seen in FIG. 8, the contact CNT has a shape extending substantially vertically downward.

A third flexible insulating layer 35 is disposed on the second flexible insulating layer 33 to cover the first touch sensing electrodes 32a, the second touch sensing electrodes 32b, and the third bridge 34c. The third flexible insulating layer 35 may include an inorganic material or an organic material.

Figure 9:
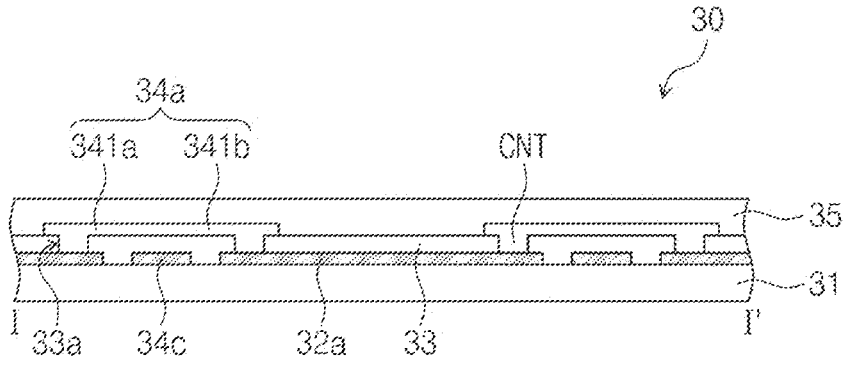
FIG. 9 is a cross-sectional view showing the flexible touch sensing panel taken along a line I-I' shown in FIG. 5 according to an exemplary embodiment.

FIG. 9 is a cross-sectional view showing a flexible touch sensing panel taken along sectional line I-I' shown in FIG. 5 according to an exemplary embodiment.

The exemplary embodiment described with reference to FIG. 9 is substantially the same as the exemplary embodiment described in association with FIG. 8, except that the first touch sensing electrodes 32a, the second touch sensing electrodes 32b, and the third bridge 34c are disposed between the first flexible insulating layer 31 and the second flexible insulating layer 33, the first bridge 34a is disposed between the third flexible insulating layer 35 and the second flexible insulating layer 33, and the contact CNT that extends downward is a portion of the first bridge 34a, and, thus, the same descriptions will be omitted.

Referring to FIG. 5 again, the folding operation may occur in a relatively small folding region FR1 shown in FIG. 5 instead of the relatively large folding region FR shown in FIG. 5. The first bridge 34a including the first portion 341a and the second portion 341b is not disposed in the folding region FR1, and the first bridge 34a is disposed in the non-folding region NFR except the folding region FR1. Therefore, when the folding region FR1 is folded, the first bridge 34a may be prevented from being damaged, and the crease and the buckling that would otherwise be formed in the folding region FR1 may be improved. Employing the relatively small folding region FR1 is generally advantageous for the in-folding with a relatively small folding radius and also may be advantageous for the out-folding when the folding radius is sufficiently small.

Figure 10:
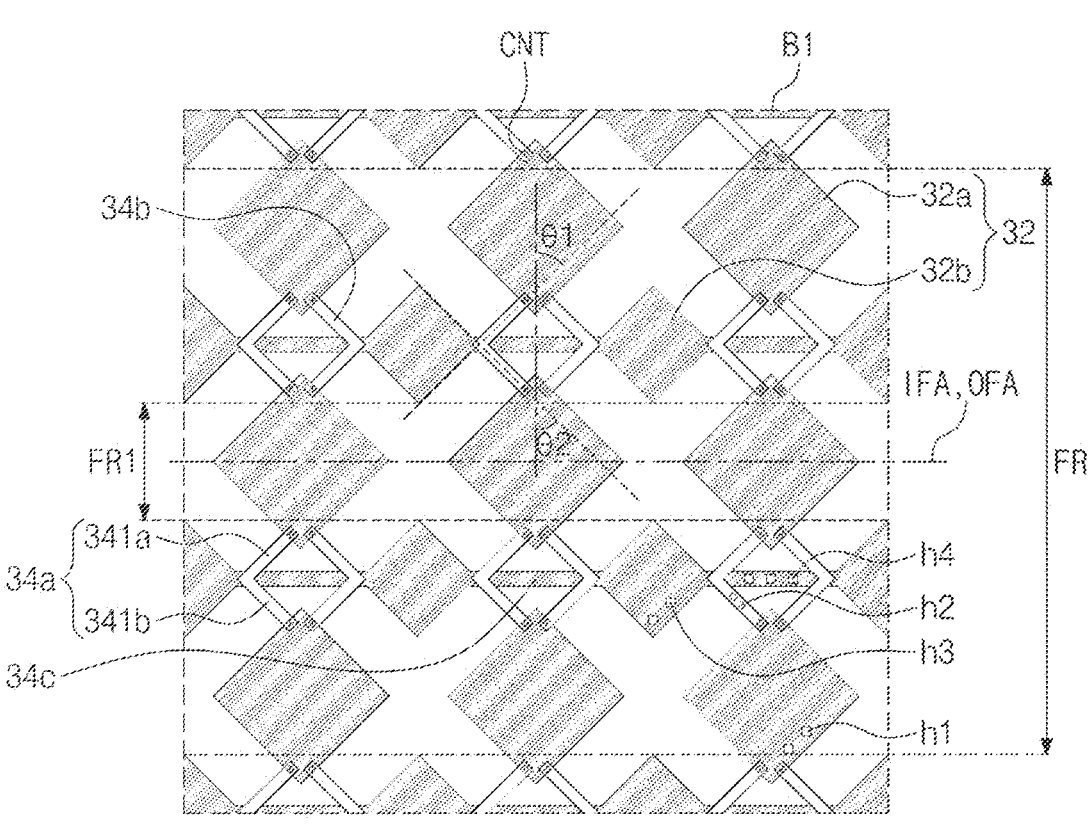
FIG. 10 is a plan view showing a flexible touch sensing panel in an area B1 of FIG. 1 according to an exemplary embodiment.
Figure 10:
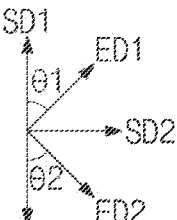

FIG. 10 is a plan view showing a flexible touch sensing panel in an area B1 of FIG. 1 according to an exemplary embodiment.

Referring to FIG. 10, the exemplary embodiment is substantially the same as the exemplary embodiment described in association with FIG. 5, except that the first standard direction SD1 in which the first touch sensing electrodes 32a are arranged to be electrically connected to each other is substantially perpendicular to the in-folding axis IFA or the out-folding axis OFA, and, thus, the same descriptions will be omitted.

Figure 11:
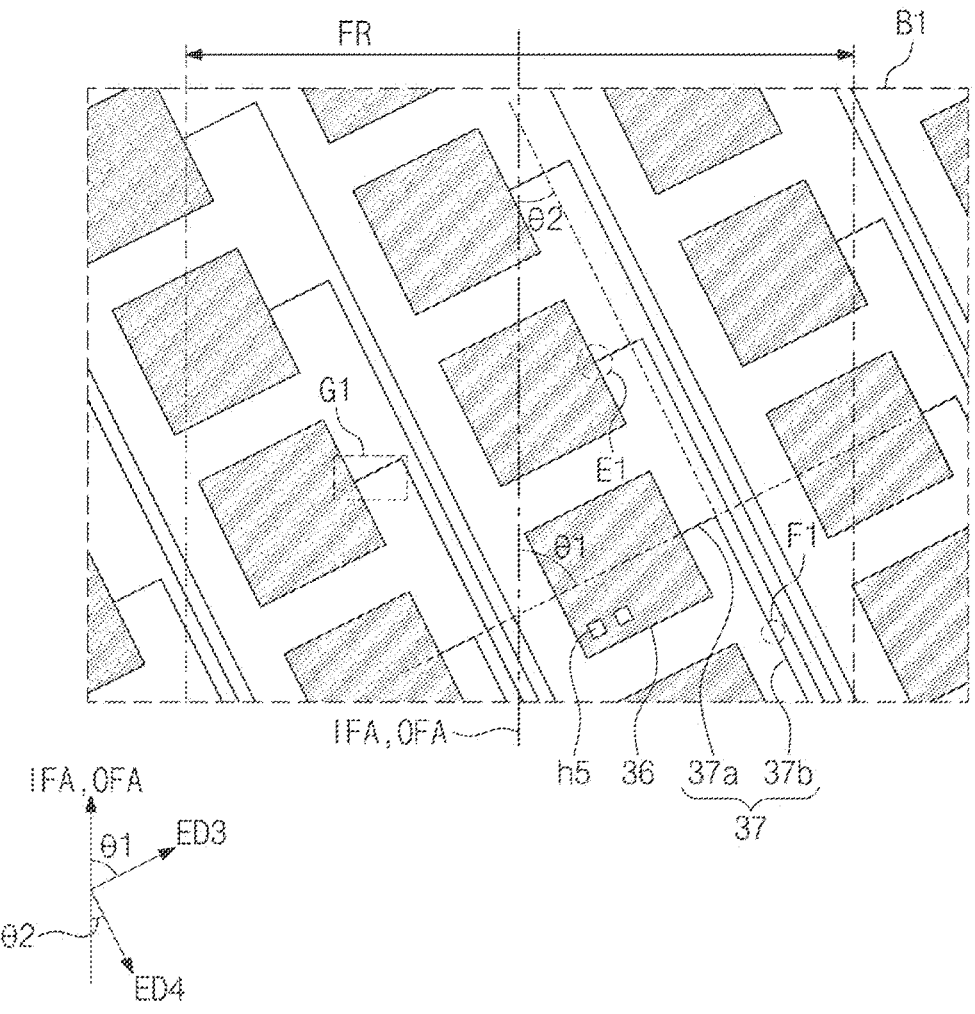
FIG. 11 is a plan view showing a flexible touch sensing panel in an area B1 of FIG. 1 according to an exemplary embodiment.

FIG. 11 is a plan view showing a flexible touch sensing panel in an area B1 of FIG. 1 according to an exemplary embodiment.

Referring to FIG. 11, a plurality of touch sensing electrodes 36 spaced apart from each other and a plurality of signal transmission lines 37 are disposed. The signal transmission line 37 transmits a signal information sensed by the touch sensing electrode 36 to the peripheral area PA. The signal transmission line 37 may overlap the pixel circuit portion PCP (refer to FIG. 2) and may have a relatively constant width. The signal transmission line 37 includes a first portion 37a and a second portion 37b.

It is advantageous that at least one selected from the group of the touch sensing electrode 36 and the signal transmission line 37 includes a metal material with flexibility by taking into account a stress applied to the folding region FR when the folding region FR is folded. For example, at least one selected from the group of the touch sensing electrode 36 and the signal transmission line 37 may have a metal single-layered structure or a metal multi-layered structure.

The touch sensing electrode 36 may include at least one light transmission hole h5. The light transmission hole h5 corresponds to the emitting portion EP of the flexible display panel 20 such that the touch sensing electrode 36 does not interfere with the light emission from the emitting portion EP.

The first portion 37a extends in a third extension direction ED3 that forms a first angle θ1 with the in-folding axis IFA or the out-folding axis OFA. In a case where the first angle θ1 is about "q×90°" (where q is a non-zero positive or negative odd integer), the first portion 37a is easily damaged when the folding region FR is folded, and in a case where the first angle θ1 is about "r×180°" (where r is an integer), the crease or the buckling may easily occur in the folding region FR when the folding region FR is folded several times. Accordingly, it is advantageous that the first angle θ1 is not about "q×90°" and is not about "r×180°."

The second portion 37b extends in a fourth extension direction ED4 that forms a second angle θ2 with the in-folding axis IFA or the out-folding axis OFA. The fourth extension direction ED4 is not substantially in line with the third extension direction ED3 and is not substantially parallel to the third extension direction ED3. The angle between the third extension direction ED3 and the fourth extension direction ED4 may be about "v×90°" (where v is a non-zero positive or negative odd integer).

In a case where the second angle θ2 is about "s×90°" (where s is a non-zero positive or negative odd integer), the second portion 37b is easily damaged when the folding region FR is folded, and in a case where the second angle θ2 is about "t×180°" (where t is an integer), the crease or the buckling may easily occur in the folding region FR when the folding region FR is folded several times. Accordingly, it is advantageous that the second angle θ2 is not about "s×90°" and not about "t×180°."

Figure 12:
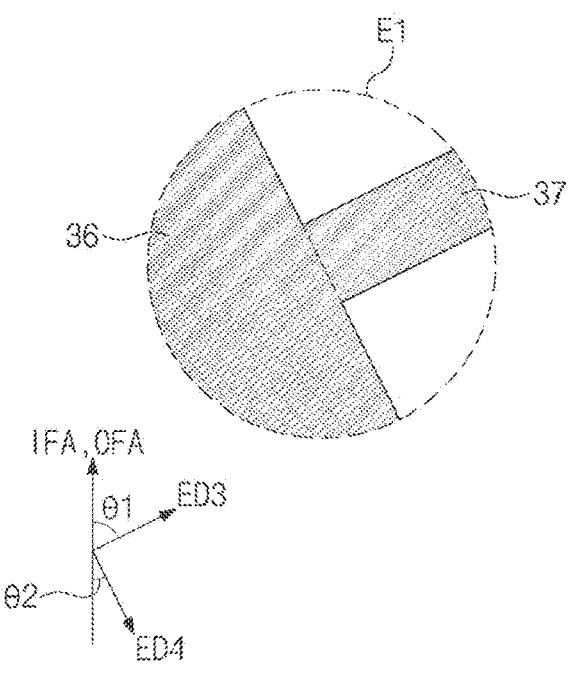
FIG. 12 is an enlarged view showing an area E1 of FIG. 11 according to an exemplary embodiment.

FIG. 12 is an enlarged view showing an area E1 of FIG. 11 according to an exemplary embodiment.

Referring to FIG. 12, the touch sensing electrode 36 may be formed in the same layer as the signal transmission line 37 and the touch sensing electrode 36 and the signal transmission line 37 may be integrally formed as one piece.

Figure 13:
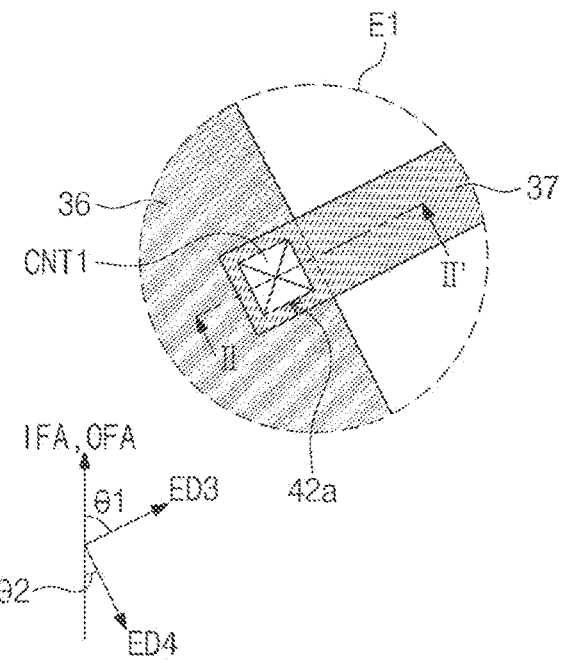
FIG. 13 is an enlarged view showing an area E1 of FIG. 11 according to an exemplary embodiment.

FIG. 13 is an enlarged view showing an area E1 of FIG. 11 according to an exemplary embodiment.

Referring to FIG. 13, the touch sensing electrode 36 and the signal transmission line 37 may be disposed on substantially different layers from each other. The touch sensing electrode 36 and the signal transmission line 37 may be electrically connected to each other by a contact CNT1 filled in a contact hole 42a.

Figure 14:
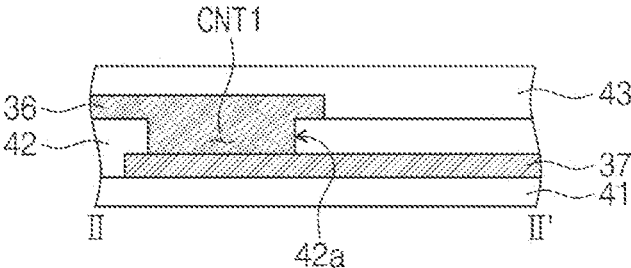
FIG. 14 is a cross-sectional view showing the flexible touch sensing panel taken along sectional line II-IF of FIG. 13 according to an exemplary embodiment.

FIG. 14 is a cross-sectional view showing the flexible touch sensing panel taken along sectional line II-IF of FIG. 13 according to an exemplary embodiment.

Referring to FIG. 14, the signal transmission line 37 is disposed on a first flexible insulating layer 41. The first flexible insulating layer 41 may include an inorganic material or an organic material. According to an exemplary embodiment, a multi-layered encapsulation structure included in the flexible display panel 20 may be employed as the first flexible insulating layer 41.

A second flexible insulating layer 42 is disposed on the first flexible insulating layer 41 to cover the signal transmission line 37. The second flexible insulating layer 42 includes the contact hole 42a defined therethrough to expose the signal transmission line 37. The second flexible insulating layer 42 may include an inorganic material or an organic material.

The touch sensing electrodes 36 are disposed on the second flexible insulating layer 42. The touch sensing electrodes 36 may include the contact CNT1 formed integrally therewith as one piece and electrically connected to the signal transmission line 37 via the contact hole 42a. In the present exemplary embodiment, the contact CNT1 has a shape extending downward.

A third flexible insulating layer 43 is disposed on the second flexible insulating layer 42 to cover the touch sensing electrodes 36. The third flexible insulating layer 43 may include an inorganic material or an organic material.

Figure 15:
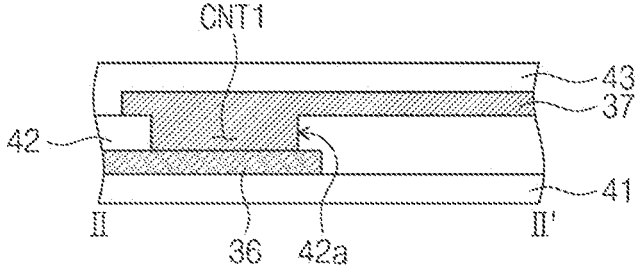
FIG. 15 is a cross-sectional view showing the flexible touch sensing panel taken along sectional line II-IF of FIG. 13 according to an exemplary embodiment.

FIG. 15 is a cross-sectional view showing the flexible touch sensing panel taken along sectional line II-IF of FIG. 13 according to an exemplary embodiment.

The exemplary embodiment described with reference to FIG. 15 is substantially the same as the exemplary embodiment described in association with FIG. 14, except that the touch sensing electrodes 36 are disposed between the second flexible insulating layer 42 and the first flexible insulating layer 41, the signal transmission line 37 is disposed between the third flexible insulating layer 43 and the second flexible insulating layer 42, and the contact CNT1 that extends downward is a portion of the signal transmission line 37, and, thus, the same descriptions will be omitted.

Figure 16:
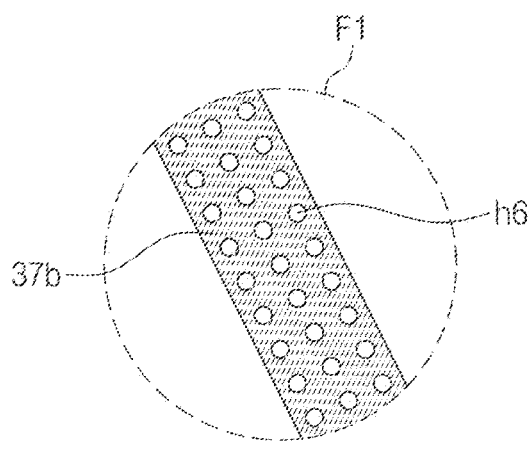
FIG. 16 is an enlarged view showing an area F1 of FIG. 11 according to an exemplary embodiment.

FIG. 16 is an enlarged view showing an area F1 of FIG. 11 according to an exemplary embodiment.

Referring to FIG. 16, the signal transmission line 37, e.g., the second portion 37b of the signal transmission line 37, may include at least one light transmission hole h6. The light transmission hole h6 corresponds to the emitting portion EP of the flexible display panel 20 such that the signal transmission line 37 does not interfere with the light emission from the emitting area EA.

Figure 17:
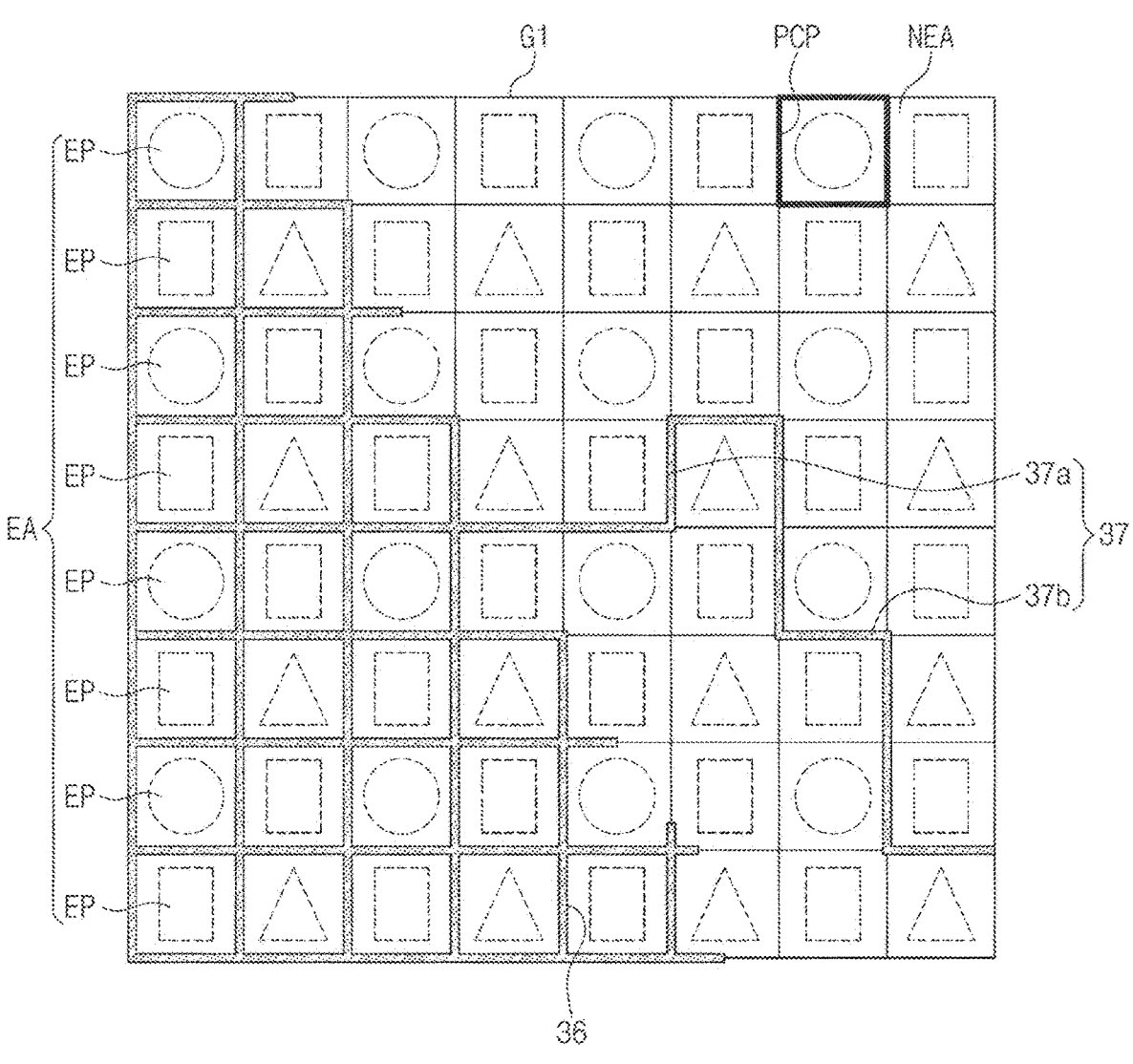
FIG. 17 is an enlarged view showing an area G1 of FIG. 11 according to an exemplary embodiment.

FIG. 17 is an enlarged view showing an area G1 of FIG. 11 according to an exemplary embodiment.

Referring to FIG. 17, the signal transmission line 37 may not include the light transmission hole h6. The signal transmission line 37 may overlap the non-emitting area NEA and may not overlap the emitting portion EP. Accordingly, the signal transmission line 37 may not interfere with the light emission from the emitting portion EP.

Figure 18:
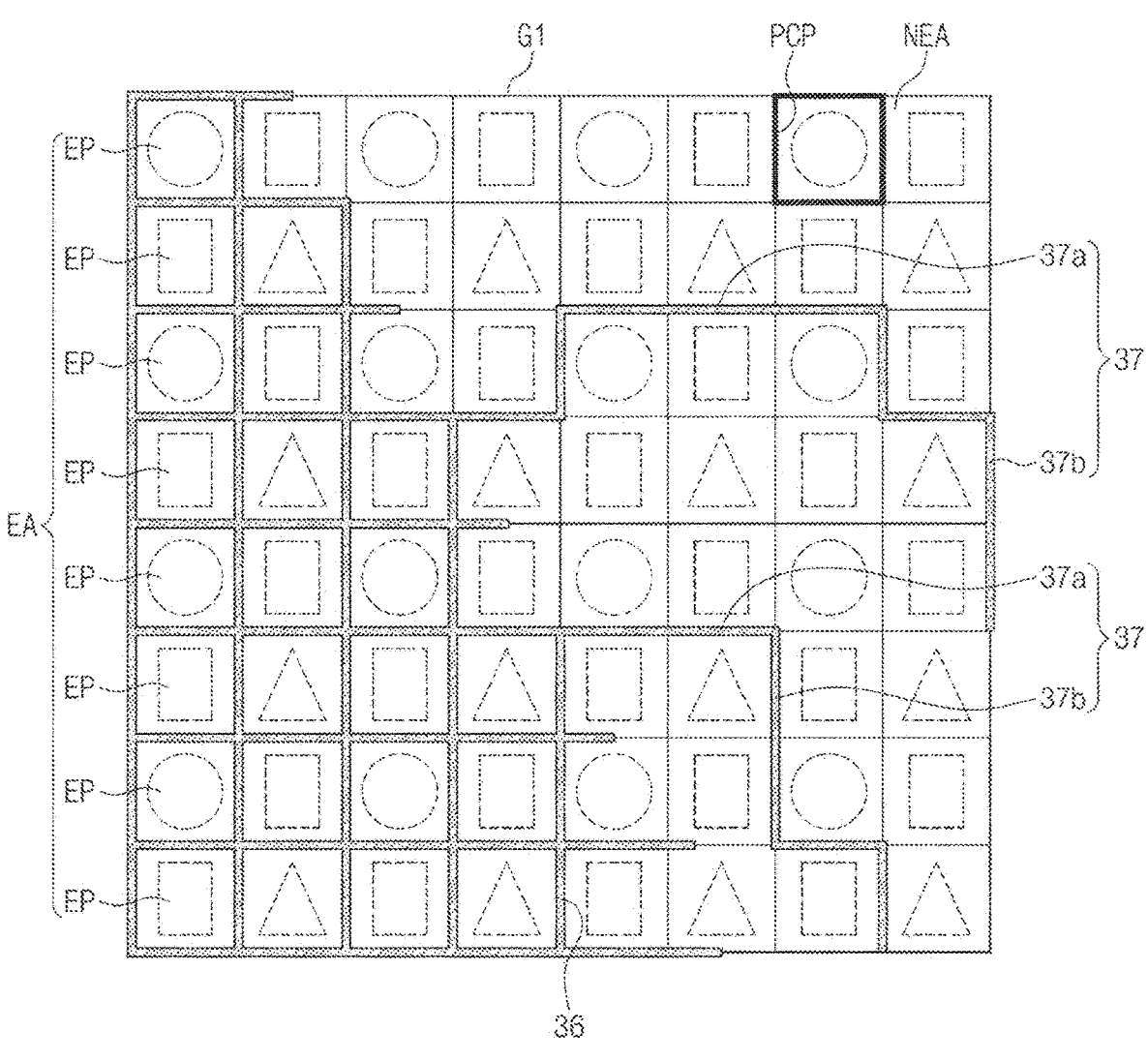
FIG. 18 is an enlarged view showing an area G1 of FIG. 11 according to an exemplary embodiment.

FIG. 18 is an enlarged view showing an area G1 of FIG. 11 according to an exemplary embodiment.

Referring to FIG. 18, the number of the signal transmission lines 37 that do not include the light transmission hole h6 may be plural. A width and an area of the signal transmission lines 37 that do not include the light transmission hole h6 are relatively small. As such, it is advantageous that the number of the signal transmission lines 37 that do not include the light transmission hole h6 is plural to prevent a signal transmission failure, which may occur when the number of the signal transmission lines 37 that do not include the light transmission hole h6 is one, during breakage or disconnection of the signal transmission line 37 that does not include the light transmission hole h6.

According to various exemplary embodiments, a foldable display device folded in a direction substantially perpendicular to a rotational axis is described as a representative example of a non-rigid device. However, the inventive concepts are not to be limited thereto or thereby. That is, the inventive concepts may be applied to a non-rigid or otherwise manipulable device, such as a rollable display device that is rolled in the direction substantially perpendicular to the rotational axis, a slidable display device that is slid in the direction substantially perpendicular to the rotational axis, and/or the like. In addition, exemplary embodiments may be applied to rigid devices or hybrid devices including at least one rigid area and at least one non-rigid area.

Although certain exemplary embodiments and implementations have been described herein, other embodiments and modifications will be apparent from this description. Accordingly, the inventive concepts are not limited to such embodiments, but rather to the broader scope of the accompanying claims and various obvious modifications and equivalent arrangements as would be apparent to one of ordinary skill in the art.

What is claimed is:

1. A non-rigid device with a flexible region that is foldable, slidable, or rollable in a second standard direction perpendicular to a rotational axis extending in a first standard direction, the non-rigid device comprising:

a flexible touch sensing panel comprising:

first touch sensing electrodes arranged in the first standard direction;

a first bridge on a layer different from a layer on which the first touch sensing electrodes are located, the first bridge connecting two first touch sensing electrodes adjacent to each other in the first standard direction from among the first touch sensing electrodes;

a second bridge in a same layer as the first bridge, symmetrical with the first bridge with respect to the first standard direction, spaced apart from the first bridge in the second standard direction, and connecting the two first touch sensing electrodes adjacent to each other in the first standard direction;

second touch sensing electrodes in a same layer as the first touch sensing electrodes, in the flexible region, and arranged in the second standard direction; and a third bridge in a same layer as the first touch sensing electrodes, connecting the second touch sensing electrodes and integrally formed with the second touch sensing electrodes as one piece extending in parallel with the second standard direction, and overlapping with the first bridge and the second bridge, wherein each of the first bridge and the second bridge has a shape inclined with respect to the first standard direction, wherein the first bridge and the second bridge do not overlap the second touch sensing electrodes, wherein the first bridge comprises at least one light transmission hole, and wherein the first bridge, the second bridge, and the third bridge are in a non-flexible region adjacent to the flexible region in the second standard direction and not in the flexible region.

2. The non-rigid device of claim 1, further comprising:

a flexible display panel under the flexible touch sensing panel, wherein the flexible display panel comprises:

emitting portions spaced apart from each other; and a non-emitting area between the emitting portions, and wherein the at least one light transmission hole overlaps with at least one of the emitting portions.

3. The non-rigid device of claim 1, further comprising:

a flexible display panel under the flexible touch sensing panel, wherein the flexible display panel comprises:

emitting portions spaced apart from each other; and a non-emitting area between the emitting portions, and wherein the second bridge does not comprise a light transmission hole.

4. The non-rigid device of claim 1, wherein:

the first bridge comprises a first portion extending in a first extension direction inclined with respect to the first standard direction, the first portion comprises an overlap area overlapping at least one selected from a group of the first touch sensing electrodes, the second touch sensing electrodes, or the third bridge; and a length of the overlap area of the first portion, which is measured in the first extension direction, is greater than an average width of the overlap area of the first portion, which is measured in a direction perpendicular to the first extension direction.

5. The non-rigid device of claim 4, wherein:

the first bridge further comprises a second portion extending in a second extension direction inclined with respect to the first standard direction, and the second extension direction is not in line with the first extension direction and is not parallel to the first extension direction.

6. The non-rigid device of claim 5, wherein:

the second portion comprises an overlap area overlapping at least one selected from a group of the first touch sensing electrode, the second touch sensing electrode, or the third bridge, and a length of the overlap area of the second portion, which is measured in the second extension direction is greater than an average width of the overlap area of the second portion, which is measured in a direction perpendicular to the second extension direction.

7. The non-rigid device of claim 1, further comprising:

a flexible display panel under the flexible touch sensing panel, wherein the flexible display panel comprises:

emitting portions spaced apart from each other; and a non-emitting area between the emitting portions, and wherein the second touch sensing electrodes comprises at least one light transmission hole, and the at least one light transmission hole overlaps with at least one of the emitting portions.

8. The non-rigid device of claim 1, further comprising:

a flexible display panel under the flexible touch sensing panel, wherein the flexible display panel comprises:

emitting portions spaced apart from each other; and a non-emitting area between the emitting portions, and wherein the third bridge comprises at least one light transmission hole, and the at least one light transmission hole overlaps with at least one of the emitting portions.

9. A non-rigid device with a flexible region that is foldable, slidable, or rollable in a second standard direction perpendicular to a rotational axis extending in a first standard direction, the non-rigid device comprising:

a flexible touch sensing panel comprising:

first touch sensing electrodes arranged in the first standard direction;

a first bridge on a layer different from a layer on which the first touch sensing electrodes are located, the first bridge connecting two first touch sensing electrodes adjacent to each other in the first standard direction from among the first touch sensing electrodes;

a second bridge in a same layer as the first bridge, symmetrical with the first bridge with respect to the first standard direction, spaced apart from the first bridge in the second standard direction, and connecting the two first touch sensing electrodes adjacent to each other in the first standard direction;

second touch sensing electrodes in a same layer as the first touch sensing electrodes, in the flexible region, and arranged in the second standard direction; and a third bridge in a same layer as the first touch sensing electrodes, connecting the second touch sensing electrodes and integrally formed with the second touch sensing electrodes as one piece extending in parallel with the second standard direction, and overlapping with the first bridge and the second bridge, wherein the first bridge comprises at least one light transmission hole and a first portion extending in a first extension direction inclined with respect to the first standard direction and a second portion extending in a second extension direction inclined with respect to the first standard direction, and wherein the first bridge and the second bridge do not overlap the second touch sensing electrodes, and wherein the first bridge, the second bridge, and the third bridge are in a non-flexible region adjacent to the flexible region in the second standard direction and not in the flexible region.

10. The non-rigid device of claim 9, wherein:

the second extension direction is not in line with the first extension direction and is not parallel to the first extension direction.

11. The non-rigid device of claim 9, wherein:

the first portion is symmetrical with the second portion with respect to the second standard direction.

12. The non-rigid device of claim 9, further comprising:

a flexible display panel under the flexible touch sensing panel, wherein the flexible display panel comprises:

emitting portions spaced apart from each other; and a non-emitting area between the emitting portions, and wherein the at least one light transmission hole overlaps with at least one of the emitting portions.

13. The non-rigid device of claim 9, further comprising:

a flexible display panel under the flexible touch sensing panel, wherein the flexible display panel comprises:

emitting portions spaced apart from each other; and a non-emitting area between the emitting portions, and wherein each of the first bridge and the second bridge does not comprise a light transmission hole, and the first bridge overlaps with the non-emitting area and does not overlap the emitting portions.

14. The non-rigid device of claim 9, further comprising:

a flexible display panel under the flexible touch sensing panel, wherein the flexible display panel comprises:

emitting portions spaced apart from each other; and a non-emitting area between the emitting portions, and wherein the second touch sensing electrodes comprises at least one light transmission hole, and the at least one light transmission hole overlaps with at least one of the emitting portions.

15. The non-rigid device of claim 9, further comprising:

a flexible display panel under the flexible touch sensing panel, wherein the flexible display panel comprises:

emitting portions spaced apart from each other; and a non-emitting area between the emitting portions, and wherein the third bridge comprises at least one light transmission hole, and the at least one light transmission hole overlaps with at least one of the emitting portions.

16. A foldable device that is foldable in a second standard direction perpendicular to a rotational axis extending in a first standard direction, the foldable device comprising:

a display panel; and a touch sensing panel disposed on the display panel, the touch sensing panel comprising:

first touch sensing electrodes arranged in the first standard direction;

a first bridge on a layer different from a layer on which the first touch sensing electrodes are located, the first bridge connecting two first touch sensing electrodes adjacent to each other in the first standard direction from among the first touch sensing electrodes;

a second bridge in a same layer as the first bridge, symmetrical with the first bridge with respect to the first standard direction, spaced apart from the first bridge in the second standard direction, and connecting the two first touch sensing electrodes adjacent to each other in the first standard direction;

second touch sensing electrodes in a same layer as the first touch sensing electrodes, in a flexible region that is foldable in the second standard direction, and arranged in the second standard direction; and a third bridge in a same layer as the first touch sensing electrodes, connecting the second touch sensing electrodes and integrally formed with the second touch sensing electrodes as one piece extending in parallel with the second standard direction, and overlapping with the first bridge and the second bridge, wherein the first bridge comprises at least one light transmission hole;

wherein each of the first bridge and the second bridge has a shape inclined with respect to the first standard direction, wherein the first bridge and the second bridge do not overlap the second touch sensing electrodes, and wherein the first bridge, the second bridge, and the third bridge are in a non-flexible region adjacent to the flexible region in the second standard direction and not in the flexible region.

* * * * *